United States Patent [19]

Ayme

[11] Patent Number: 5,067,741
[45] Date of Patent: Nov. 26, 1991

[54] DEVICES USING A DOLLY FOR REINFORCING THE LOADING CAPACITY OF TRACTOR VEHICLES

[75] Inventor: Jacques Ayme, Montelimar, France

[73] Assignee: A.C.T.M., France

[21] Appl. No.: 281,146

[22] Filed: Dec. 8, 1988

[30] Foreign Application Priority Data

Dec. 10, 1987 [FR] France .................. 87 17212

[51] Int. Cl.⁵ .................................. B62D 12/02
[52] U.S. Cl. ........................ 280/419; 280/476.1
[58] Field of Search ............ 280/419, 407.1, 476.1, 280/DIG. 9, DIG. 14, 426; 180/140

[56] References Cited

U.S. PATENT DOCUMENTS

| | | | |
|---|---|---|---|
| 2,127,868 | 8/1938 | Huffman | 280/419 |
| 3,292,725 | 12/1966 | Hlinsky | 180/140 |
| 3,438,652 | 4/1969 | Hoffacker | 280/476.1 |
| 4,286,798 | 9/1981 | Butler et al. | 280/91 |
| 4,468,047 | 8/1984 | McGhie | 280/419 |

FOREIGN PATENT DOCUMENTS 2091180  7/1982  United Kingdom ............ 280/476.1

Primary Examiner—Charles A. Marmor
Assistant Examiner—Mitchell Bompey
Attorney, Agent, or Firm—William A. Drucker

[57] ABSTRACT

The invention relates to the control of the steering of the wheels of a dolly interposed between a tractor and a semi-trailer. The bars controlling the steering of the wheels of the dolly are actuated by a power system controlled from a pilot stage detecting the steering movement of the wheels of the tractor. The pilot stage comprises a pilot link freely rotating on a shaft and driven in rotation by a transmission connected to the steering lever of the wheels of the tractor; the rotation of the pilot link selectively controls a hydraulic valve which actuates a double-acting actuator connected to a link controlling the steering bars.

8 Claims, 7 Drawing Sheets

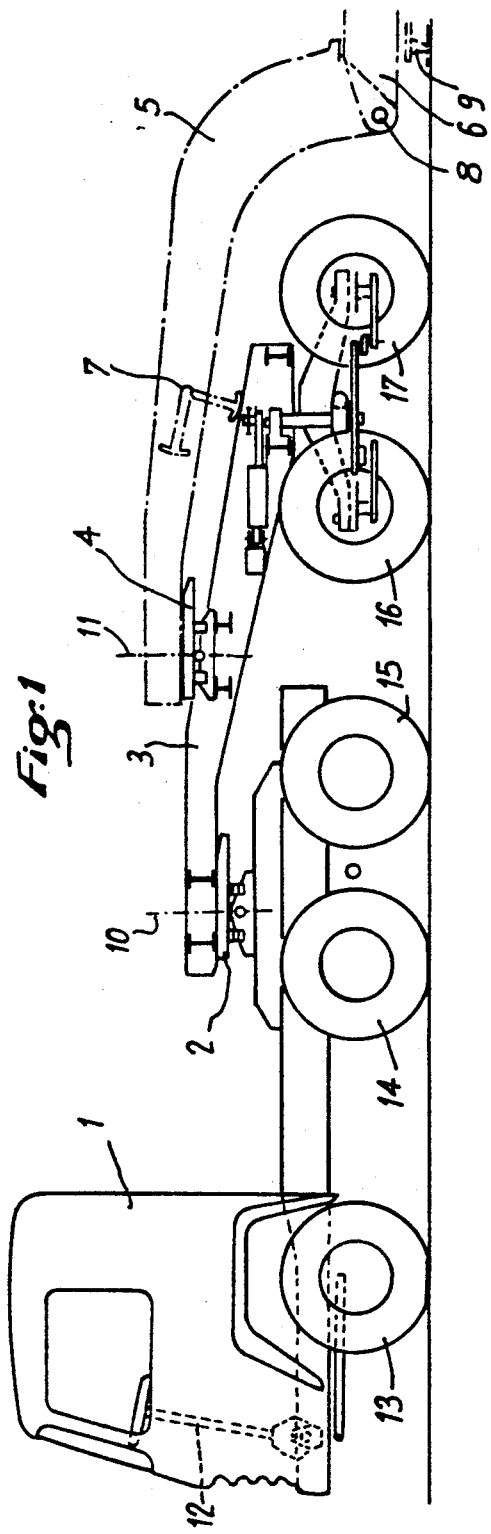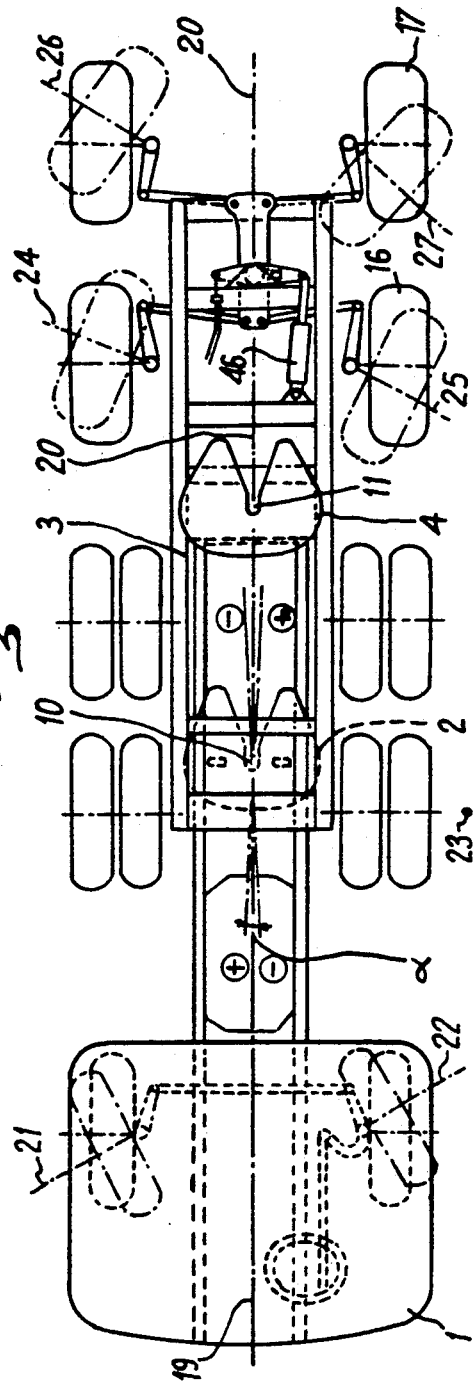

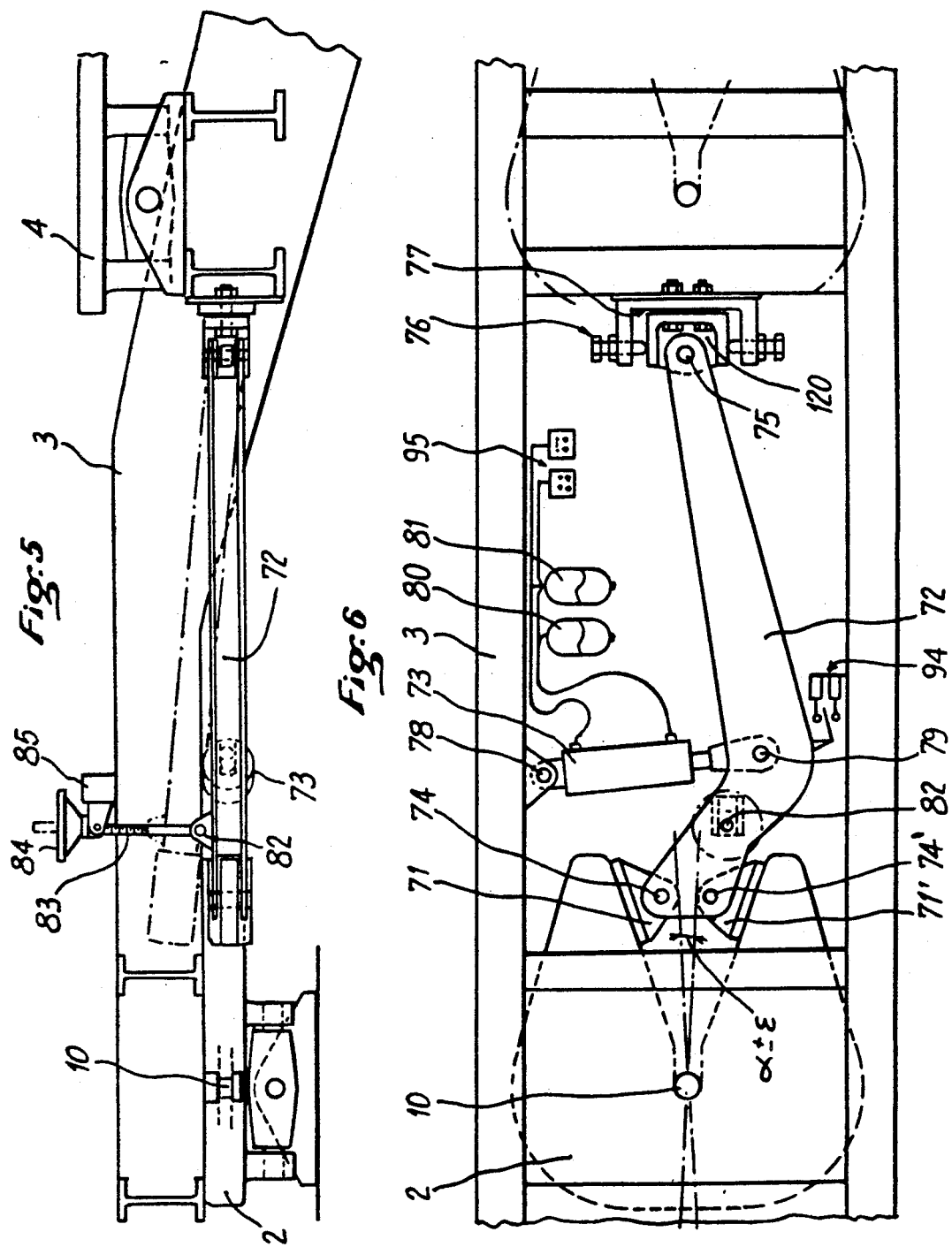

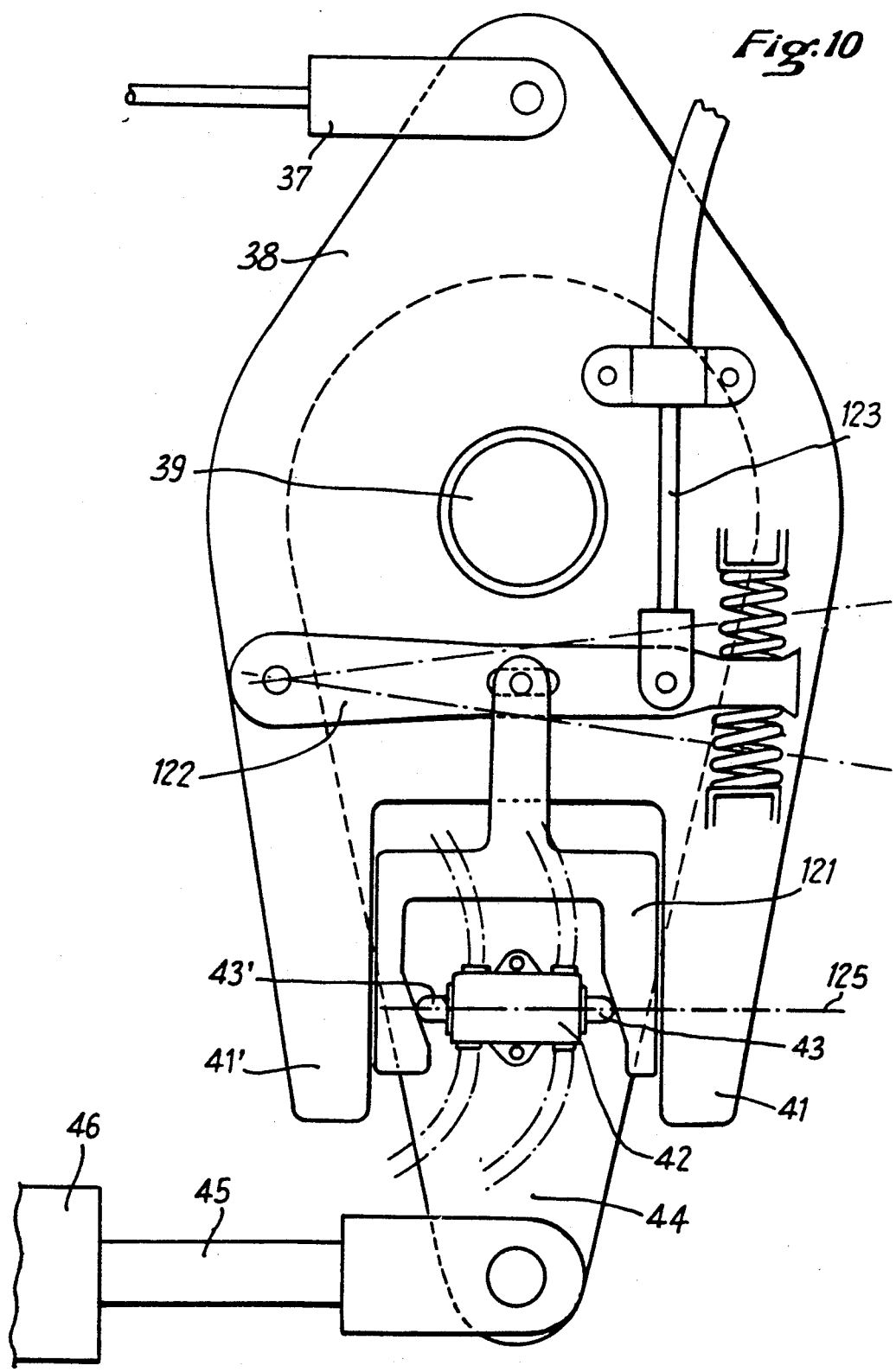

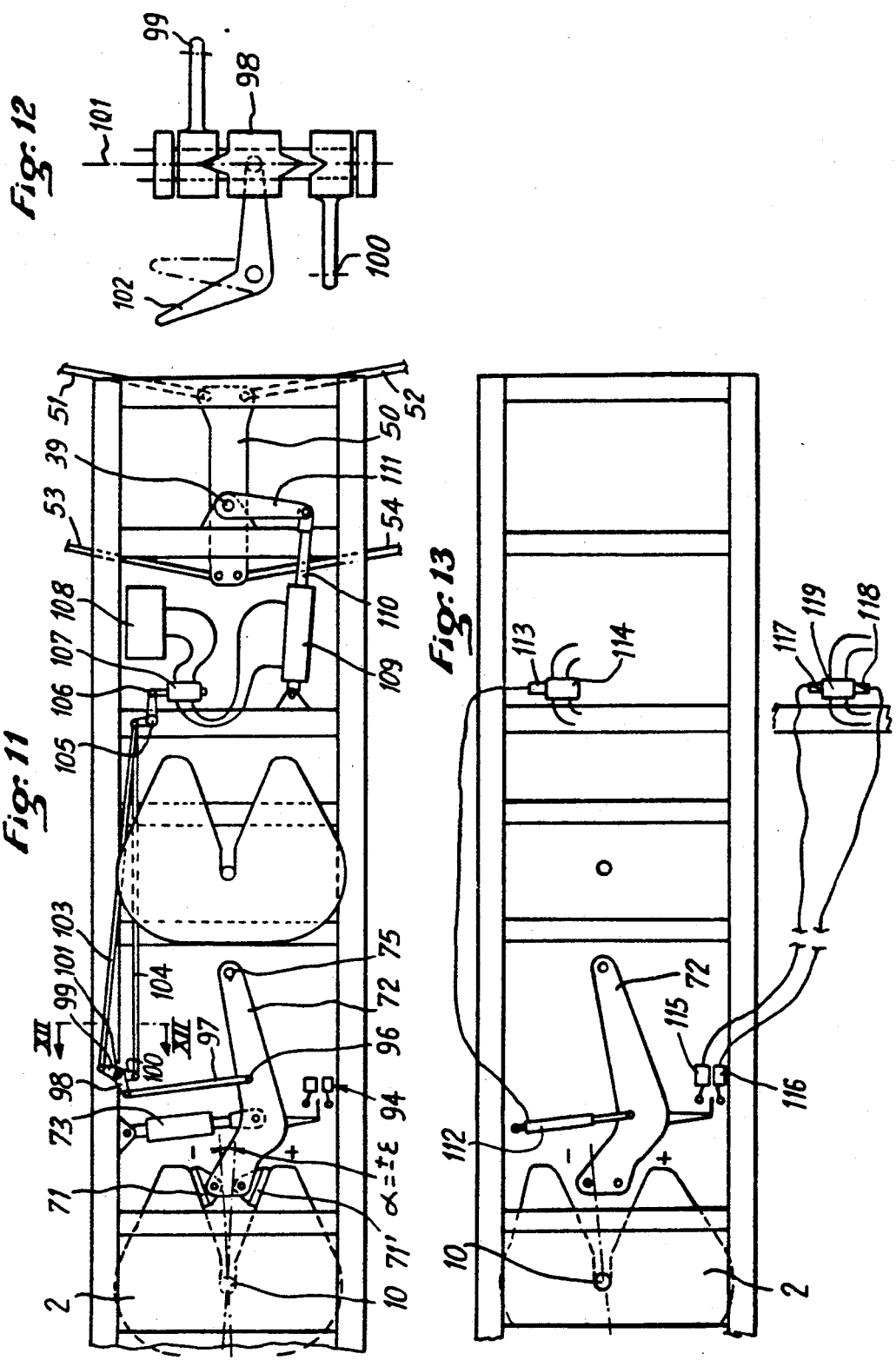

DEVICES USING A DOLLY FOR REINFORCING THE LOADING CAPACITY OF TRACTOR VEHICLES

BACKGROUND OF THE INVENTION

A means system is known for reinforcing the loading capacity of a tractor vehicle, making it possible for it to be hitched under a semi-trailer for transporting heavy loads, the system consisting in the addition of a dolly which is itself similar to a very short semi-trailer hitched to the pulling vehicle. The dolly in turn receives in its center, by means of a second hitching system, the front part of the semi-trailer for transporting heavy loads.

Thus, an assembly of three successive elements is obtained articulated two by two about a vertical shaft, comprising two articulation points generally formed by means of automatic couplings.

In a known embodiment, the dolly wheels are not steerable. The dolly travels in the tracks of the tractor when the assembly is travelling in a straight line and remains close to the inside of the turn when the assembly negotiates a curve. Rearward travel is possible, but it relies on the skill of the driver.

In a second known improved embodiment, the wheels of the dolly are steerable from a so-called "independent" control system which is generally only used for particular maneuvers and particularly for rearward travel because it requires the presence of a special driver, in charge of this control.

In other known embodiments, the wheels of the dolly are steerable from a so-called "automatic" control system, therefore requiring no driver. These systems are all based on the detection of the relative angle about the vertical axis of the articulation between the dolly and the tractor which is in the form of a curve and which increases inversely to the radius of the curve. They are generally designed to cause the wheels of the dolly to follow the track of the non steerable wheel trains of the tractor.

These known systems do not operate in rearward travel, because the more the curve of evolution decreases, the more the angle increases which causes an increase of the angle of the steerable wheels of the dolly, resulting in rearward travel, in further reducing the curve of evolution of the dolly which therefore rapidly skews with respect to the tractor. In order to provide rearward travel it is necessary to provide, in addition, a second control for steering the dolly, called independent, and to go over from automatic steering to independent steering. It should be noted that the rearward travel maneuvers are important in articulated trucks for transporting heavy loads, for very often the semi-trailer itself has its front part in the form of a swanneck, which can be uncoupled from its platform to allow easy loading of the load and the front part must then move back before recoupling.

It is further to be noted that for certain maneuvers, the driver of the tractor desires to change direction on the spot, which he can do with the steering wheels of his tractor but then the steering wheels of the dolly do not move, and it is only when the tractor advances that the procedure: formation of the curve of evolution of the tractor on the ground, formation of the relative angle between the dolly and the tractor then changing the steering direction of the wheels of the dolly, will take place. This delay may be prejudicial with respect to the desired maneuver.

SUMMARY OF THE INVENTION

The present patent application has as an object a device for the automatic steering of the wheels of a dolly and it is characterized in that this device comprises means for automatically controlling the wheels of the dolly which are such that the steering lock values obtained for the steering wheels of the dolly maintain the longitudinal axis of the dolly substantially in the alignment of the longitudinal axis of the tractor, not only in a straight line but also in a curve and not only in forward travel but also in rearward travel. The result of maintaining this aligned configuration not only in a straight line but also in a curve is to confer on the assembly, formed by the tractor and the dolly connected through an articulation by a hitching coupler, the characteristics of evolution on the road of a tractor alone having the total dimensions and the total load capacity of its two component elements coupled together. It will be understood that this reduction of two vehicles into a single one, in so far as the steering control characteristics and the evolution characteristics on the road are concerned, has advantages in use with respect to designs based on the effective rotation of the dolly about the vertical shaft connecting the latter to the tractor. Thus, the articulated assembly for transporting heavy loads formed of three elements (tractor, dolly and semi-trailer) articulated about two vertical shafts, in fact behaves like an articulated assembly formed of two elements only: a tractor sub-assembly and a semi-trailer with a single vertical articulation which is brought into play, the other vertical articulation only operating through angles $\alpha$ of very small values, of about $+/-2°$.

In a first embodiment of the device of the invention, the means for automatically controlling the steering of the wheels of the dolly make the wheels dependent on the steering of the wheels of the tractor. For this, these means comprise mainly a pilot stage whose function is to detect the information relative to the amount of steering movement of the wheels of the tractor and to transmit this information to a power system situated on the dolly and capable of orienting the steering wheels thereof. The means for transmitting the information by the pilot stage may be of any appropriate known type, e.g. mechanical, electric, hydrostatic or pneumatic.

The automatic steering of the wheels of the dolly from the steering movements of the steering wheels of the tractor does not detect the residual alignment defect angle formed by the longitudinal axis of the dolly with that of the tractor, which results from the practical imperfections of the system. Although this defect tends to be cancelled out in forward travel, it increases in rearward travel. To overcome this drawback, in accordance with the invention a complementary system is added to the device, which only acts in rearward travel, which measures the alignment defect angle and makes, in the pilot stage for automatic steering of the wheels of the dolly, a correction which is a function of this measurement. This correction is added algebraically to the general orientation reference of the wheels of the dolly given by the wheels of the tractor.

In another embodiment of the device of the invention, steering of the wheels of the dolly is controlled, in all the operating modes, from the detection of the small relative angular movements between the dolly and the tractor, resulting form alignment defects between their respective longitudinal axes. The means for detecting the small angular movements between the dolly and the tractor, as well as transmission of this information to the control of the dolly wheels, may be of any known appropriate type, e.g. mechanical, electrical, or others.

In the case of rearward travel, the direction of the angles to be given to the wheels of the dolly must be reversed so as to maintain the longitudinal axis of the dolly substantially in the extension of that of the tractor. For that, in accordance with the invention, a device is provided which automatically reverses the direction of actuation of the steering of the wheels of the dolly during rearward travel operation.

BRIEF DESCRIPTION OF THE DRAWINGS

For a better understanding of the device of the invention, two embodiments and variants will be described hereafter by way of non limiting examples, with reference to the accompanying schematic drawings in which:

FIG. 1 is a partial elevational view of an articulated road rig, showing the tractor, the dolly and the front swan-neck part of the trailer;

FIG. 2 is a top view corresponding to FIG. 1;

FIG. 5 is a partial elevational view of the dolly hitched to the tractor and showing an optional complementary system which ensures resilient limitation of the angular alignment defect movements between the tractor and the dolly;

FIG. 6 is a top view corresponding to FIG. 5;

FIG. 10 is, on a larger scale, a top view of a device complementary to that shown in FIG. 3 and required for carrying out rearward travel maneuvers;

FIG. 11 is a top view of a second embodiment of a device in accordance with the invention, making the steering of the wheels of the dolly dependent on the angular alignment defect movements between the tractor and the dolly, the transmission of the movement detection being provided mechanically;

FIG. 12 is an enlarged vertical sectional view through line XII—XII of FIG. 11; and FIG. 13 is a top view of a variant of the device shown in FIG. 11, the transmission of the movement detection taking place through a modulated electric signal.

DESCRIPTION OF THE PREFERRED EMBODIMENTS

Figure 3:
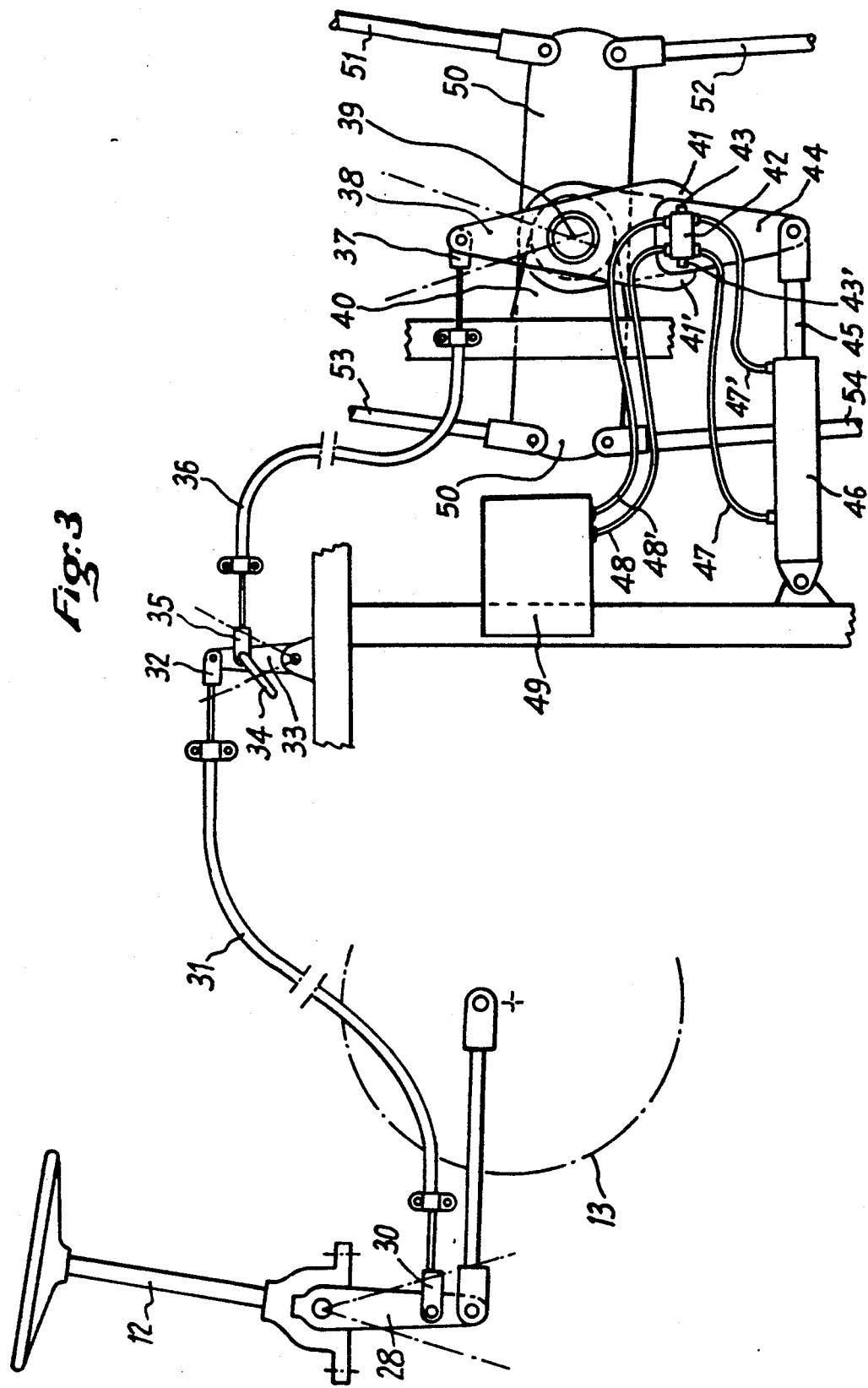
FIG. 3 is a general view of a first embodiment of a device of the invention making the steering of the wheels of the dolly dependent on the steering movements of the wheels of the tractor, the transmission of the movement information being provided mechanically; the tractor equipment part being shown in elevation whereas the dolly equipment part is shown in a top view.

Referring to FIGS. 1 and 2, an articulated road rig has been partially shown, generally used for transporting heavy loads. This assembly comprises a tractor 1 equipped with an automatic hitching coupler 2 to which is articulated, about a vertical shaft 10, a very short semi-trailer 3 called a dolly, resting on the ground on sets of steering wheels 16, 17. The dolly 3 is also equipped, in its central part, with an automatic hitching coupler 4 to which is articulated, about a vertical shaft 11, the front swan-neck shaped part 5 of a semi-trailer with chassis 6. Since the sets of wheels of the semi-trailer are situated towards the rear end thereof, they have not been shown in FIGS. 1 and 2.

The semi-trailer shown, intended for transporting heavy loads, comprises a swan-neck 5 which is detachable from chassis 6 forming a platform by means of a pin 8. The front of chassis 6 then bears on the ground through a prop system 9 shown with broken lines in FIG. 1. The swan-neck 5 detached from chassis 6 of the semi-trailer is then entirely supported by dolly 3 by means of the hitching coupler 4 and a stand 7 which is turned down. The advantage of the detachable swan-neck is to facilitate the loading of heavy masses on the platform chassis 6. Attachment of the swan-neck 5 to the platform chassis 6 is easier to carry out since the evolutive capacities of the assembly formed by the tractor 1 and the dolly 3, in rearward travel and forward travel, are better, which is obtained with the device of the invention.

The purpose of the device of the invention is to cause the wheels 16, 17 of dolly 3 to be steered so that, in the different possible hypotheses, travelling in a straight line, in curves, forward travel and rearward travel, the longitudinal axis 20 of dolly 3 remains substantially in alignment with the extension of the longitudinal axis 19 of tractor 1.

In a first embodiment of the device of the invention, shown in FIG. 3, it comprises means connecting the steering of wheels 16, 17 of dolly 3 to the steering gear 12 of the steering wheels 13 of tractor 1. The device comprises mainly a "pilot" stage whose function is to transmit the information relative to the amount of steering movement of the wheels 13 of tractor 1 to a power system (actuator) situated on dolly 3 and capable of orienting the wheels 16, 17 thereof. This pilot stage comprises a flexible sheathed steel rod 31 one end of which is connected by a fork-joint 30 to a lever 21 of the steering gear 12 of the wheels 13 of tractor 1. The flexible rod 31 is extended as far as the rear of tractor 1 for connection at its other end by a fork-joint 32 to a link 33 articulated on the chassis of tractor 1. Another flexible sheathed rod 36 is disposed on dolly 3; it comprises at the front a fork-joint 35 which is attached to link 33 on the tractor by means of a pin 34 and ends at the rear of dolly 3 in a fork-joint 37 connecting it to a pilot link 38 rotating freely on a shaft 39, mounted on the chassis of dolly 3 by bearings 40. The pilot link 38 ends at its other end in a fork whose two fingers 41 and 41' are positioned on each side of a progressive hydraulic pilot valve 42 having two push-rods 43 and 43' for moving the slide of the valve.

The "power" stage of the device comprises a link 44 to which is fixed valve 42, this link being fixed on shaft 39. A double link 50 is also fixed on shaft 39 in its lower part. Link 50 receives at its ends the pivoting fork joints of four bars 51, 52, 53 and 54 which control respectively the orientation of the four wheels of the sets of wheels 16, 17 of dolly 3. Valve 42 is connected by flexible pipes 48 and 48' to a central pressurized oil generator 49, disposed on the dolly 3; it could also be disposed on tractor 1 so that its pump is then driven by the engine of the tractor. Valve 42 is also connected by flexible pipes 47 and 47' to the two chambers of a double-acting actuator 46 whose rod 45 is precisely connected by a fork-joint and a pin to the end of link 44 which supports the body of the valve 42.

With this arrangement, any movement of the pilot link 38, itself controlled by any movement of lever 28 of the steering gear 12 of tractor 1, causes a parallel movement of the power link 44, according to the operating principle called "follower travel". In fact, if the fork finger 41 of the pilot link 38 which moves comes to bear on the push-rod 43 of valve 42, the latter will feed pressurized oil through the flexible pipe 47' into the rod side chamber 45 of actuator 46, which will result in pulling link 44 which carries the valve body 42 until the latter is brought back into a central position with respect to its slide, i.e. until link 44 supporting the valve is again oriented in the alignment of the pilot link 38 which is itself subjected to the movements of the lever 28 of the steering gear 12 of the wheels of the tractor. It will be understood that if the driver of the tractor continues his steering action in one direction or in the other, the "power" system for orienting the wheels of dolly 3 follows this movement in parallel according to the direction and the amount defined by the driver.

It is noted that the respective angles of orientation of the axes 24, 25, 26 and 27 of the wheels of dolly 3 are defined by the geometry of the steering gear in relationship with the angles of orientation of the axes 21 and 22 of the steering wheels 13 of tractor 1 which are such that the convergence of these axes on the fixed axis 23 of the rear axle or double rear axle of tractor 1, at a single fictitious point of rotation of the assembly of the wheels of the tractor and of the dolly, ensures that the longitudinal axis 20 of dolly 3 is kept substantially in alignment in the extension of the longitudinal axis 19 of tractor 1.

It is known however that the geometric principles determining the respective values of the steering angles for the different wheels of a vehicle do not permit a strict convergence of all the wheel axes to be obtained at a single point of rotation. Thus, the alignment of the longitudinal axis 20 of the dolly in the extension of the longitudinal axis 19 of the tractor will not be perfect, especially for high steering values of the wheels. In some cases it is possible to increase the accuracy by adding optionally to the device of FIG. 3 a system for resiliently limiting the alignment defect angle $\alpha$ between the axes 19 and 20.

Such a resilient limitation system, shown in FIGS. 5 and 6, comprises mainly shoes 71 and 71' engaging in the inlet opening of the automatic hitching coupler 2. These shoes are articulated by means of shafts 74 and 74' on the front end of a beam 72 itself articulated by means of a shaft 75 to a bearing 120 fixed to the dolly chassis 3. It is advantageous for the position of this articulation bearing to be adjustable laterally by means of a device 76 and longitudinally by means of a shim device 77, for example, so as to correctly adjust the median line of the perfect alignment.

Beam 72 is maintained resiliently in the median position by a double-acting damper 73 articulated at 79 to beam 72 and at 78 to the chassis of dolly 3. This double-acting damper, which may be of any suitable type, mechanical, pneumatic or hydraulic, is here shown of the hydraulic type comprising a double-acting actuator whose two chambers are connected respectively to oleo-pneumatic accumulators 80 and 81.

Regulation of the pressure of the resilient fluid in accumulators 80 and 81 makes it possible to adjust the alignment return force. Manostats 95 or position detectors 94 set off an admissible limit force or limit alignment defect alarm. To give an idea of size, the maximum value for angle $\alpha$ may be of the order of $+/-3$ to $5°$.

The assembly of the resilient limitation device may be retracted by raising by means of a system with screw 83 fixed at 82 to beam 72 with a wheel 84 mounted on a hub bearing 85. Such retraction instantaneously frees the vertical shaft 10 for rotation of dolly 3 about tractor 1 and may facilitate certain operations such as coupling or uncoupling of tractor 1 under dolly 3 by means of the automatic hitching coupler 22.

Figure 7:
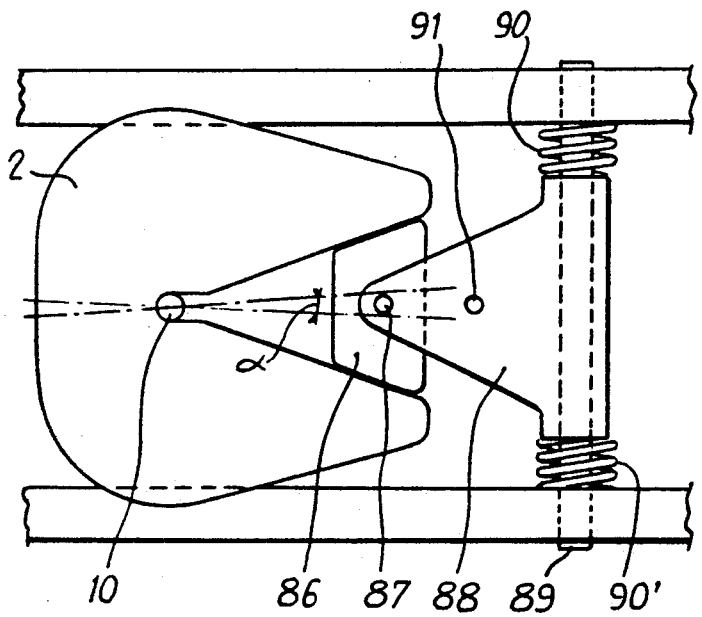
FIG. 7 is a top view of a variant of the resilient limitation system.
Figure 9:
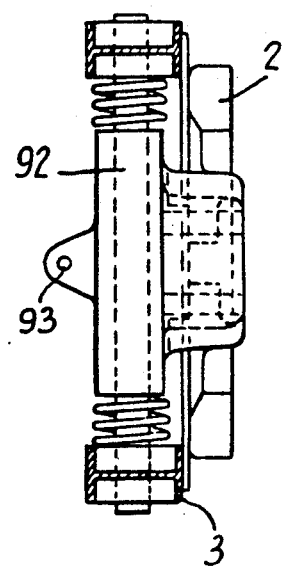
FIG. 9 is a vertical section through line IX—IX of FIG. 8.
Figure 8:
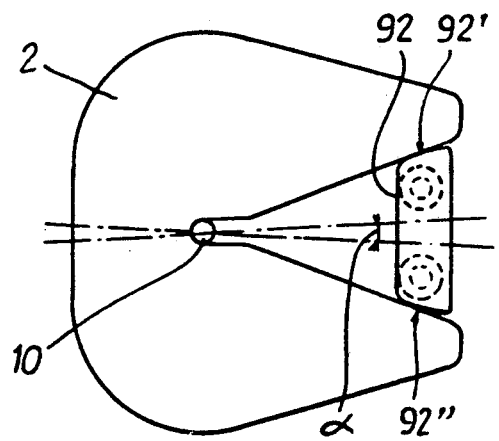
FIG. 8 is a top view of another variant of the resilient limitation system.

In FIG. 7 a less elaborate variant has been shown of the resilient limitation device which comprises mainly a shoe 86 articulated by a pin 87 on an arm 88 sliding under shaft 89 between two springs 90 and 90' which ensure the resilient alignment return limitation. A screw and wheel system, such as shown in FIGS. 5 and 6, is fixed by an articulation at 91 for retraction by raising. In FIGS. 8 and 9, another variant has been shown which is designed in the same spirit as that shown in FIG. 7 but which comprises two shoes 92' and 92" articulated to arm 92, the whole being retractable by means of a screw and wheel system articulated at point 93.

The automatic steering of the wheels of the dolly from the orientation movements of the steering wheels of the tractor, such as described in connection with FIG. 3, does not detect the residual alignment defect angle of the longitudinal axis 20 of the dolly in the extension of the longitudinal axis 19 of tractor 1, this defect resulting from the practical imperfections of the system.

In fact, whereas in forward travel this alignment defect angle tends naturally to be cancelled out, because the dolly 3 is pulled by tractor 1, in rearward travel the dolly 3 is pushed by the tractor and the alignment defect angle increases rapidly. It is therefore necessary to add to the system shown in FIG. 3 a complementary device whose purpose is to measure the alignment defect angle and to make the necessary correction, depending on this measurement, in the pilot stage for automatic steering of the dolly. At a given moment, this correction may be of the same direction or in the opposite direction to the general orientation reference of the wheels of the dolly, given by the position of the wheels of the tractor, depending on whether it is a question of forward travel or rearward travel.

There is then added to the device of FIG. 3 a complementary device shown in FIG. 10 and comprising mainly a double sliding cam 121, whose two arms are inserted between the pushers 43 and 43' of the progressive valve 42 and the fingers 41 and 41' of the fork ending the pilot link 38. The double cam 121 is connected to a link 122, itself connected to the end fork-joint of a sheathed flexible steel rod 123. The other end of the flexible steel rod is connected to link 99 of the rearward travel coupling system shown in FIG. 11, which will be described in greater detail below. Link 99, once engaged by means of a control 102 to a link 98 is itself connected by a rod 97 to a member measuring the alignment defect angle $\alpha$ between the longitudinal axis of the tractor and that of the dolly, this member being in the example shown the resilient limitation beam 72. The mechanical assembly such as described transmits then to the double cam 121 the movements which are the images of the sign and of the size of the alignment defect angle α and cam 121 modifies the action of the main pilot fork 41—41' on pushers 43 and 43', to reduce the alignment defect angle α of the dolly with respect to the tractor, while maintaining the order of size of the main steering reference of the pilot link 38 connected to lever 28 controlling the steering gear 12 of the wheels 13 of tractor 1.

In forward travel this complementary device shown in FIG. 10 is generally disengaged by a control 102 shown in FIGS. 11 and 12, and the double cam 121 comes back to the middle position 125 of zero incidence between pushers 43 and 43' and arms 41 and 41' of the main pilot fork.

Figure 4:
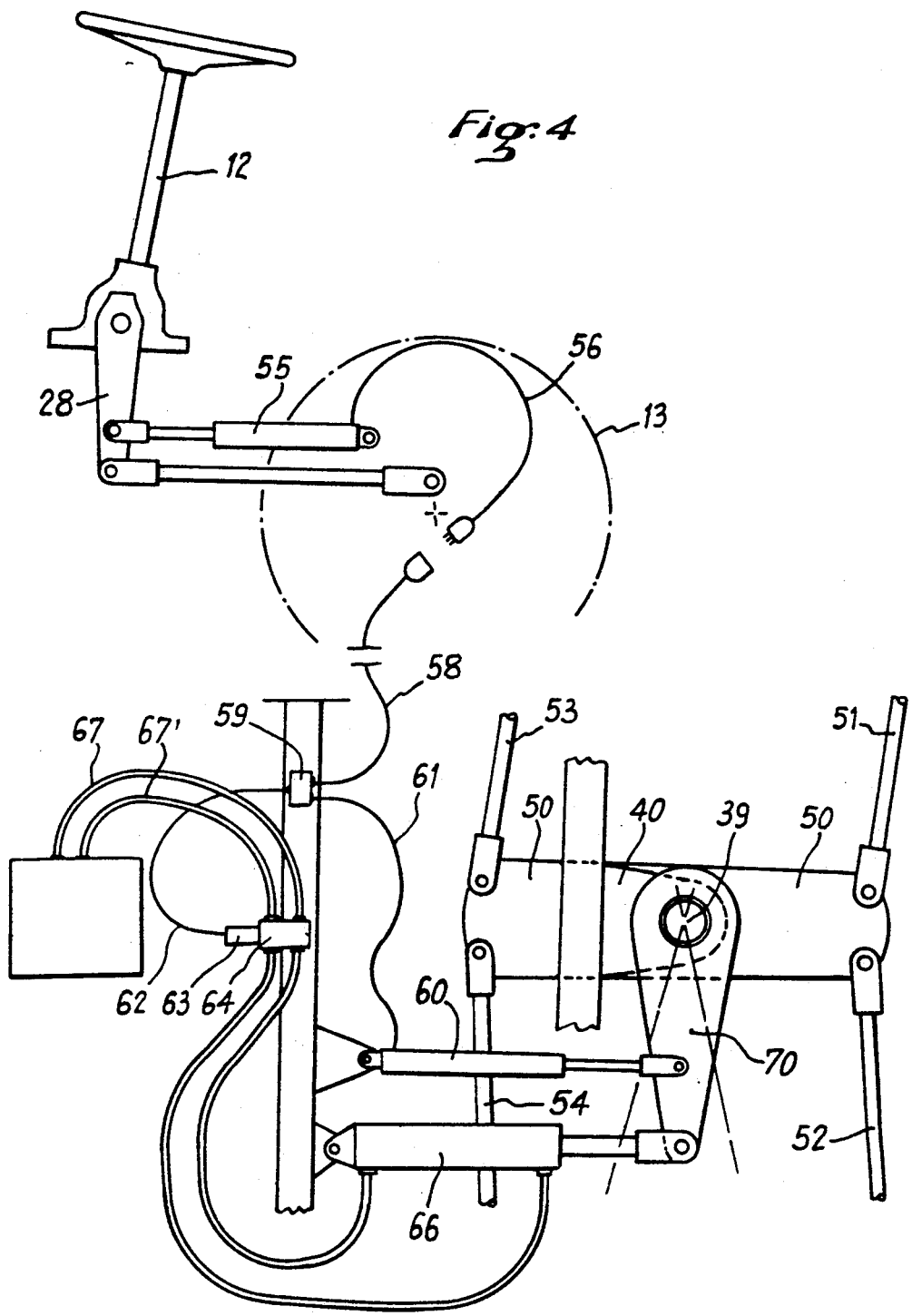
FIG. 4 is a general view, similar to FIG. 3, of a variant of the device of this figure, the transmission of the movement information taking place by means of a modulated electric signal.

Referring to FIG. 4, a variant has been shown of the device in FIG. 3 in which the transmission of the information by the pilot stage is achieved differently by means of an electric modulated signal delivered by a potentiometer 55 and transmitted by wiring 56 and 58 to the ratio operator 59. Another potentiometer 60 fixed on the power link 70 sends to operator 59 through wiring 61, the image signal of the degree of orientation for the wheels of the dolly. Operator 59 delivers a proportional corrective signal conveyed by wiring 62 to the solenoid 63 of a servo-valve 64 which feeds the pressurized hydraulic fluid to one or the other face of the piston of the actuator 56. The system then operates as a follower exactly as described above with reference to FIG. 3.

The dolly 3 may be maintained in alignment behind tractor 1, in rearward travel, by means of a third potentiometer measuring the movements of a member sensitive to the variation of the alignment defect angle α between the longitudinal axis of the tractor and that of the dolly (this member being for example the resilient alignment limitation beam shown in FIGS. 5 and 6) and sending a modulated signal to the ratio operator 59 designed for algebraically adding this third signal. The operation of the assembly is then similar to that described for the device shown in FIG. 10.

It will be understood that, without departing from the scope of the invention, any other known method of transmitting information between the tractor and the dolly could be used, for example a hydrostatic transmission of very small size which would replace the flexible sheathed steel rods 31 and 36 shown in FIG. 3 or a pneumatic modulated pressurized air transmission which would replace the potentiometer system shown in FIG. 4.

Referring now to FIGS. 11 and 12, another embodiment of the device of the invention has been shown. In this embodiment, steering of the wheels 16 and 17 of the dolly is controlled from the detection of the small relative angular movements between dolly 3 and tractor 1 resulting from alignment defects of the longitudinal axis 20 of dolly 3 in the extension of the longitudinal axis 19 of tractor 1. The operation of the device is such that, as soon as the tractor begins to steer to the right or to the left, a small angle is formed about the vertical shaft 10 between the longitudinal axis of the tractor and that of the dolly, i.e. the coupler 2 fixed to tractor 1 rotates slightly about the pivot 10 fixed to dolly 3, this small angle α being of sign (+) or (−) depending on whether the tractor begins to turn to the left or to the right. This angular movement causes the movement of beam 72 through the shoes 71 and 71'. The movement of beam 72 is in its turn transmitted, by a linkage assembly formed by a rod 97 anchored at a point 96 on the beam, a system of change of direction links 98 and 99 or 100 articulated on pin 101, a rod 103 or a rod 104 and a change of direction link system 105, as far as a slide 106 of a progressive hydraulic valve 107 which sends the pressurized oil coming from the generation unit 108 into one or other of the two chambers of a double-acting actuator 109, depending on the sign (+) or (−) of the angle α. Rod 110 of actuator 109 is retracted or extended and moves a link 111 fixed to shaft 39. A double link 51 fixed to the same shaft 39 drives the steering bars 51, 52, 53 and 54 of the four wheels of the dolly. This orientation of the dolly wheels results in bringing the longitudinal axis 20 of the dolly into the extension of the longitudinal axis 19 of the tractor. In fact, if the oil output fed by the progressive valve were too small, the angle α would continue to increase, which would result in further opening the progressive valve which would then feed a higher output; conversely, as soon as angle α decreases, the oil output is reduced. If the angle α changes sign, the oil output is reversed in the two chambers of actuator 109 and the wheels of the dolly would be oriented in the opposite direction.

However, since the angle α is by construction small, the corresponding corrective movements which are exerted on the slide 106 of valve 107 are small and do not exceed the travel of the slide. But the driver generally controls the steering of the front wheels 13 of tractor 1 up to very considerable angular values which cause the axes of the front wheels of the tractor to converge on a common point of rotation situated on the fixed shaft 23 of the rear axle (or rear axles) of tractor 1, fairly close to the tractor and which therefore requires the rolling axes of the wheels of the dolly to be also steered through considerable angles 24, 25, 26 and 27 so that they converge on the point of rotation common to all wheels. It is then necessary and it is sufficient, so that the system operates correctly, i.e. so that it follows the urging of the tractor, to inscribe itself in a curve of reduced radius without the alignment defect angle α at any time exceeding the limit construction value of the order of +/−3° to 5°, for the capacity of increase in the unit of time of the angular movement of the axes of the wheels of the dolly, itself defined by the maximum instantaneous output of the progressive valve 107, to be equal to or greater than the increase of angular movement of the axes of the steering wheels of the tractor imposed by the driver of the tractor.

In the case of failure of the system for steering the wheels of the dolly, the angle α increases and one or other of the limit position detectors 94 delivers an alarm signal.

In the case of steering the tractor on the spot, this latter, when it advances, will have to move slowly so as to allow the steering system of the wheels of the dolly to steer the latter sufficiently rapidly so as not to reach the limit alarm value of the angle α. To comply with this case, the pressurized oil generation unit 108 could advantageously comprise an oleo-pneumatic accumulator whose instantaneous output would be high.

In the case of rearward travel, it is apparent that the direction of the angles to be given to the wheels of the dolly must be reversed so as to maintain the longitudinal axis 20 of dolly 3 substantially in the extension of the longitudinal axis 19 of tractor 1. For this, a system of change of direction links 98, 99 and 100, rotating about shaft 101, makes it possible from a pulling force of rod 97 on link 98 to obtain either a pulling force on rod 103 by means of the link 99 coupled by lever 102 to link 98 or a compression force on rod 104 by means of link 101 coupled by lever 102 to link 98. The direction of the action on slide 106 of the progressive valve 107 is then reversed, which thus reverses the pressurized oil flow from one actuator chamber 109 to the other chamber and thus reverses the steering direction of the wheels of the dolly.

The above described reversal device has been given by way of example and it will be readily understood that any other suitable known system for reversing a mechanical movement could be used.

In FIG. 13, a simple variant of the system of FIG. 11 has been shown, in which the transmission of the movement of beam 72 resulting from the alignment defect angle α of the dolly behind the tractor is no longer provided mechanically, but by sending a modulated electric signal delivered by a potentiometer 112 and fed to a solenoid 113 of a servo-valve 114. The servo-valve 114 feeds one or the other of the two chambers of the double acting actuator 109 under the same conditions as those provided by the progressive valve 107. The system shown in FIG. 13 may further operate by means of two electric contacts 115 and 116 delivering "all or nothing" signals, namely signifying here "left-right" fed to the two solenoids 117 and 118 of the hydraulic electrovalve 119.

In the case of rearward travel, it is necessary, as explained above for the system shown in FIG. 11 to reverse the steering direction of the wheels of the dolly so as to provide rearward travel. This reversal is here provided by means of a sign reversal apparatus operating on the modulated signal delivered by potentiometer 112 or by means a reversing contactor operating on the two signals delivered by the electric contacts 115 and 116.

It will be understood that the above description has been given solely by way of example, without any limitative character, and that constructional additions or modifications could be made thereto without departing from the scope of the invention defined by the accompanying claims. It will be understood in particular that the device for resiliently limiting the alignment defect between the longitudinal axis of the tractor and that of the dolly only forms an accessory system whose use is in no way obligatory. When this device is not used, it will then be understood that measurement of the alignment defect angle α for controlling the cancellation thereof during rearward travel operation of the device shown in FIG. 3 or in FIG. 4 may then be obtained, instead of beam 72, by any suitably disposed member sensitive to the pivoting of the tractor with respect to the dolly.

What is claimed is:

1. A device for reinforcing a loading capacity of a tractor vehicle for receiving a transport semi-trailer for transporting heavy loads, which comprises:
   (a) an intermediate short semi-trailer called a dolly having a longitudinal axis and having a front part coupled to the tractor vehicle having tractor steering wheels and having a longitudinal axis, said dolly freely pivotable about a vertical axis and coupled to the transport semi-trailer in its turn for freely pivoting about a vertical axis,
   (b) dolly steering wheels secured to said dolly,
   (c) detecting means associated with said tractor steering wheels for detecting an amount of steering movement of said tractor steering wheels,
   (d) control means associated with the dolly steering wheels to control a steering movement thereof, and
   (e) means connecting said detecting means and said control means to automatically provide, for any variation of a steering position of the tractor steering wheels, a variation of a steering position of the dolly steering wheels such that the longitudinal axis of the dolly is subtantially in alignment with the longitudinal axis of the tractor vehicle in straight line travel as well as in curved travel and in forward travel as well as in rearward travel.

2. A device for reinforcing a loading capacity of a tractor vehicle for receiving a transport semi-trailer for transporting heavy loads, which comprises:
   (a) an intermediate short semi-trailer called a dolly having a longitudinal axis and having a front part coupled to the tractor vehicle having tractor steering wheels and having a longitudinal axis, said dolly freely pivotable about a vertical axis and coupled to the transport semi-trailer in its turn for freely pivoting about a vertical axis,
   (b) dolly steering wheels secured to said dolly,
   (c) detecting means associated with said tractor steering wheels for detecting an amount of steering movement of said tractor steering wheels,
   (d) control means associated with the dolly steering wheels to control a steering movement thereof, and
   (e) means connecting said detecting means and said control means to automatically provide, for any variation of a steering position of the tractor steering wheels, a variation of a steering position of the dolly steering wheels such that the longitudinal axis of the dolly is substantially in alignment of the longitudinal axis of the tractor vehicle in a straight line as well as in a curve and in forward travel as well as in rearward travel, wherein said detecting means comprises a pilot stage which comprises a pilot link freely rotating on a shaft mounted for rotation on a chassis of the dolly and driven in rotation from a transmission connected to a lever of a steering gear of the tractor steering wheels, said pilot link having one end in the form of a fork cooperating with control pushers of an hydraulic valve connected to two chambers of a double-acting actuator, said valve being carried by a power link fixed on said shaft and to which one end of a piston rod of said actuator is coupled, a double link being also fixed on said shaft and being connected at its ends to bars controlling orientation of the dolly steering wheels so that any movement of the pilot link controlled by a steering of the tractor steering wheels causes a parallel movement of the power link.

3. The device as claimed in claim 2 comprising a double cam disposed slidingly between fingers of the fork of the pilot link and the pushers of the hydraulic valve, said double cam being connected by a transmission to an oscillating lever detecting an alignment defect angle between the longitudinal axis of the tractor vehicle and that of the dolly, said transmission only being used during rearward travel operation.

4. A device for reinforcing a loading capacity of a tractor vehicle for receiving a transport semi-trailer for transporting heavy loads, which comprises:
   (a) an intermediate short semi-trailer called a dolly having a longitudinal axis and having a front part coupled to the tractor vehicle having tractor steering wheels and having a longitudinal axis, said dolly freely pivotable about a vertical axis and coupled to the transport semi-trailer in its turn for freely pivoting about a vertical axis, (b) dolly steering wheels secured to said dolly, (c) detecting means associated with said tractor steering wheels for detecting an amount of steering movement of said tractor steering wheels, (d) control means associated with the dolly steering wheels to control a steering movement thereof, and (e) means connecting said detecting means and said control means to automatically provide, for any variation of a steering position of the tractor steering wheels, a variation of a steering position of the dolly steering wheels such that the longitudinal axis of the dolly is substantially in alignment of the longitudinal axis of the tractor vehicle in a straight line as well as in a curve and in forward travel as well as in rearward travel, wherein said detecting means comprises a pilot stage which comprises an electric operator device connected on the one hand to a potentiometer connected to a steering control of the tractor steering wheels and on the other hand to a potentiometer connected to a power link fixed on a shaft which is fast with a double link connected to bars controlling an orientation of the dolly steering wheels, said operator device receiving electric modulated signals which are images of a degree of orientation of the tractor steering wheels and of the dolly steering wheels and being connected to a servo-valve for delivering thereto a corrective signal controlling supply to a double acting hydraulic actuator acting on the power link for correcting an orientation of the dolly steering wheels as a function of an orientation of the tractor steering wheels.

5. The device as claimed in claim 4 wherein an additional potentiometer is provided for measuring an angular movement of a lever proportional to an alignment defect angle between the longitudinal axis of the tractor vehicle and that of the dolly, said additional potentiometer then sending a modulated signal during rearward travel operation to the operator device which provides an algebraic sum of this signal and of those received from the other two potentiometers.

6. A device for reinforcing a loading capacity of a tractor vehicle having a tractor steering wheel for receiving a transport semi-trailer for transporting heavy loads, which comprises:

(a) an intermediate short semi-trailer called a dolly having a longitudinal axis and having a front part coupled to the tractor vehicle freely pivotable about a vertical axis and coupled to the transport semi-trailer in its turn for freely pivoting about a vertical axis, said tractor vehicle having a longitudinal axis, (b) dolly steering wheels having bars controlling a steering thereof, (c) means for automatically controlling the dolly steering wheels, which comprise:

(d) a pivoting lever carried by the dolly and co-acting with a fixed coupling element of the tractor vehicle, (e) a double-acting actuator carried by a chassis element of the dolly and having a piston rod, (f) a rotating shaft, a power link fixed on said shaft and connected to a piston rod of said double-acting actuators, (g) a double link also fixed on said rotating shaft and connected to said bars, (h) an hydraulic valve carried by the dolly and selectively controlling supply of two chambers of the actuator, and (i) a linkage connecting said pivoting lever to a control slide of the hydraulic valve, (j) said means acting to maintain the longitudinal axis of the dolly substantially in alignment of the longitudinal axis of the tractor vehicle in a straight line as well as in a curve and in forward travel as well as in rearward travel.

7. The device as claimed in claim 6 wherein said linkage comprises a system reversing a direction of actuation of the control slide of said hydraulic valve during rearward travel operation.

8. The device as claimed in claim 6 wherein transmission of a movement of the pivoting lever is provided by means of a modulated electric signal delivered by a potentiometer connected to said pivoting lever, said signal being provided to a servo-valve selectively supplying one or other chamber of the double-acting actuator.

* * * * *